United States Patent [19]
Sotomayor

[11] Patent Number: 5,842,206
[45] Date of Patent: Nov. 24, 1998

[54] COMPUTERIZED METHOD AND SYSTEM FOR QUALIFIED SEARCHING OF ELECTRONICALLY STORED DOCUMENTS

[75] Inventor: Bernardo Sotomayor, Burnsville, Minn.

[73] Assignee: Iconovex Corporation, Hopkins, Minn.

[21] Appl. No.: 700,148

[22] Filed: Aug. 20, 1996

[51] Int. Cl.⁶ ................................................. G06F 17/30
[52] U.S. Cl. .................... 707/5; 707/2; 707/3; 707/4; 707/501; 707/513
[58] Field of Search ............................ 707/2, 3, 4, 501, 707/513, 5

[56] References Cited

U.S. PATENT DOCUMENTS

| | | | |
|---|---|---|---|
| 5,708,825 | 1/1998 | Sotomayor | 707/501 |
| 5,721,897 | 2/1998 | Rubinstein | 707/2 |

OTHER PUBLICATIONS

Chris O'Malley, "Slicker Searching on the Web. (Quarterdeck WebCompass)", Computer Shopper, vol. 16, No. 6, Jun., 1996, p. 384.

Patricia J. Smith, "WebCompass takes Web Searching in the Right Direction. (Quarterdeck's WebCompass Professional Web Browser)", Seybold Report on Desktop Publishing, vol. 10, No. 10, Jun. 10, 1996.

Terry Maguire, "Iconovex's Technology: A White Paper on S. W. A. P. I.", pp. 1–9, (Jun. 14, 1996).

Erica Swerdlow, et al., "Announcing Webanchor: Inconovex's Latest Addition to Its Suite of Organizational Tools", EBS Public Relations, Inc., Iconovex News Release, 1–3.

Erica Swerdlow, et al., "Iconovex Announces The Release of Indexicon 2.0 With New Features For More Versatile Indexing", EBS Public Relations, Inc., Iconovex News Release, 1–2.

Erica Swerdlow, et al., "Iconovex Introduces Anchorpage for Windows, Windows NT and Windows 95", EBS Public Relations, Inc., Iconovex News Release, 1–2.

"AnchorPage—Software that Understands Ideas", *Iconovex brochure*.

"INDEXICON 2.0 for Microsoft Word and WordPerfect—Windows", *Iconovex brochure*.

"Reflex Plus: The Database Manager—User's Guide", pp. 91–120, (1987).

"WebAnchor", *Iconovex brochure*.

*Primary Examiner*—Paul R. Lintz
*Attorney, Agent, or Firm*—Schwegman, Lundberg, Woessner, and Kluth, P.A.

[57] ABSTRACT

A computerized method for searching one or more electronically stored documents is disclosed. The method comprises four steps. The first step searches each document for a search expression. The second step analyzes each document containing the search expression to determine one or more significant concepts within the document. The third step generates an abstract for each concept of each document containing the search expression. The fourth step searches each abstract for the search expression or alternatively for related expressions or ideas as well. In a further embodiment, the method also comprises the step of sorting the abstracts in order of significance of their corresponding concepts. In yet a further embodiment, the method also comprises the step of sorting the abstracts in alphabetical order of their corresponding concepts. Other embodiments include a computerized system for implementing the computerized method, and a computer-readable storage medium having a program thereon for directing a computer to perform the method.

12 Claims, 3 Drawing Sheets

COMPUTERIZED METHOD AND SYSTEM FOR QUALIFIED SEARCHING OF ELECTRONICALLY STORED DOCUMENTS

FIELD OF THE INVENTION

This invention relates generally to searching documents that are electronically stored on a computer, and more particularly to improving the accuracy of such searching by qualifying the search results.

BACKGROUND OF THE INVENTION

Increasingly, information relating to every aspect of modern-day life is stored not on pieces of paper bound together and inserted with other bound pieces of paper into file folders, but electronically on computer-readable media such as hard disks, tape storage media, and the like. This has provided archivists the ability to vastly increase the amount of information stored, since a given storage medium can hold the equivalent of great amounts of paper documents. For example, an entire encyclopedia can be stored on a typical compact disc-read only memory (CD-ROM), with much room to spare.

With this increased reliance on electronic storage, however, has come the need for better ways in which to navigate the electronically stored information. Historically, information stored within paper documents is typically navigated by using an elaborate indexing system. For example, books in the Library of Congress, as well as books in other libraries, are organized according to a predetermined scheme by subject matter, such that cards corresponding to the books are placed in a card catalog also organized according to that scheme.

Such organization schemes have found application to information stored electronically as well. A typical example is the Windows Explorer utility accompanying Microsoft Windows 95, an operating system for PC-compatible computers. Windows Explorer shows information as individual files, organized into different file folders according to a user's particular preferences. This scheme, employing the metaphor of files in file folders as is frequently with respect to paper documents, has become quite successful for organizing particular types of electronically stored information.

However, with the increased generation of electronically stored information, seemingly on an exponential basis, such predetermined organization schemes are inadequate. One problem is that the generation of electronically stored information has out paced efforts to timely classify the information into one or more predetermined categories. A further problem is that the electronically stored information is frequently ephemeral, existing today but potentially changing tomorrow or next week, and thus defying easy and final classification.

A well recognized solution to these and other such difficulties has been the increased usage of search engines. Search engines are tools implemented on a computer and that search the contents of a given set of electronically stored documents for a particular search expression. A search expression at its most rudimentary level usually comprises one or more key words. If each of these key words is present within in a document, the computer flags that document for the user's later retrieval and review.

In this way, documents are not organized as to any predetermined organizational scheme, but rather are "organized" on the fly, according to a user's current needs. For example, if a user needs all information on "multiple sclerosis," he or she simply enters in these keywords into a search engine, which then returns a listing of all electronically stored documents containing these words. The user then retrieves and reviews the individual documents, to determine whether each document is in fact relevant to the search expression.

A significant problem with the use of search engines is their finding too many documents to flag for retrieval and review. For example, a ten-thousand word document may refer to "multiple sclerosis" only once, or multiple times but in an irrelevant manner, but a search engine would still flag the document for retrieval and review. The user, therefore, is left in the unenviable position of having to navigate through many documents that are tangentially, if at all, related to "multiple sclerosis."

Prior art approaches for refining search engines have not alleviated this problem. One approach is to provide the user the first few sentences of every document, along with its title, when providing a list of the documents that have been found to contain the search expression. Although this approach provides the user with a more immediate manner in which to determine whether a particular document is relevant, it is not a panacea. Frequently, for example, the first few sentences of a document do not provide a clue as to that document's relevance.

A second approach is to analyze the documents in a statistical manner. For example, each document may be analyzed to determine a word frequency value that takes into account the number of times the search expression appears in a document, as compared to the document's length. The search engine then provides the user with a list of documents containing the expression, in descending order by word frequency value. This approach is also far from perfect: the frequency with which an expression appears in a document does not necessarily correlate to the relevance of that document to the expression.

There is a need, therefore, for overcoming the inherent deficiencies in utilizing search engines to navigate vast numbers of electronically stored documents. There is a need to ensure that a search engine yields a list of documents that are significantly relevant to the search expression provided by the user. That is, there is a need for an engine that yields greater accuracy in performing a search of electronically stored documents for only those documents related to a given search expression.

SUMMARY OF THE INVENTION

This invention relates to searching one or more electronically stored documents. In one embodiment of the invention, a computerized method comprises four steps. The first step searches each document for a search expression. This may entail either directly searching each document, or directing one or more search engines to conduct the search. The second step analyzes each document containing the search expression to determine one or more significant concepts within the document. The third step generates an abstract for each concept of each document containing the search expression. The fourth step searches each abstract for the search expression, and alternatively for related expressions or ideas as well.

In this manner, the present invention provides for a number of advantages. The invention ensures that a search engine yields of documents that are significantly more relevant to a given search expression than do the prior art. The second step analyzes each document to obtain the concept of the document, while the fourth step then searches the abstract for each concept of each document for the search expression, and alternatively, for related expressions or ideas as well. In this manner, only the most significantly relevant documents are provided to the user.

That is, the invention determines one or more underlying concepts of each document that contains the search expression, through the use of linguistic or other analysis. These concepts relate to what a given document is "about." This provides for much greater accuracy in performing searches on electronically stored documents, which in one embodiment is accomplished by injecting intelligence (linguistic analysis) into the search process.

In a further embodiment of the invention, the method also comprises the step of sorting the abstracts in order of significance of their corresponding concepts. In yet a further embodiment, the method also comprises the step of sorting the abstracts in alphabetical order of their corresponding concepts. In one embodiment of the present invention, the search expression comprises one or more keywords.

Other embodiments of the present invention include a computerized system for searching one or more documents in accordance with the method as herein sunmmarized. Still other embodiments include a computer-readable storage medium having a computer program for directing a computer to perform the summarized method. Still other and further aspects, advantages and embodiments of the present invention will become apparent in the following description and by reference to the accompanying drawings.

DETAILED DESCRIPTION OF THE DRAWINGS

Figure 1:
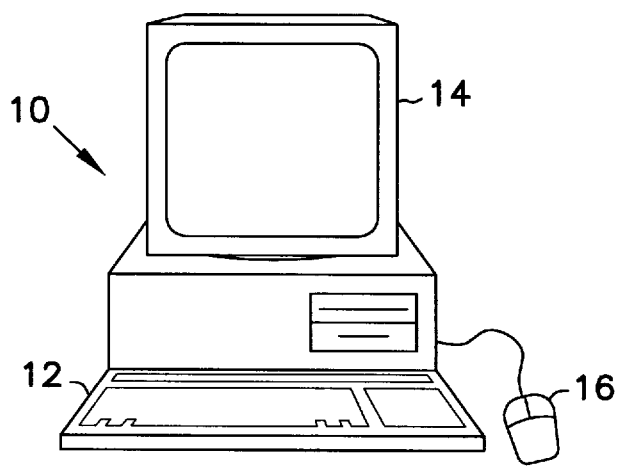
FIG. 1 is a diagram of a typical computer on which a computer program according to the present invention is run.

The present invention effectuates improved computerized searching of electronically stored documents by qualifying the results of such searching. A diagram of a typical computer on which the present invention is implemented is shown in FIG. 1. Computer 10 usually includes keyboard 12, display device 14 and pointing device 16. Computer 10 has a program running thereon in accordance with the present invention. Display device 14 can be any of a number of different devices, such as a computer monitor employing a cathode ray tube (CRT). Pointing device 16 as shown in FIG. 1 is a mouse, although the invention is not so limited.

Not shown is that computer 10 typically also comprises a random-access memory (RAM), a central-processing unit (CPU), and one or more storage devices, such as a hard disk drive, a floppy disk drive, or a tape cartridge drive, although the invention is not so limited. In the case where a storage device is a floppy disk drive, the program is typically stored on a floppy disk for insertion into the disk drive. Furthermore, in one embodiment of the invention, the documents are electronically stored on a storage device. The invention is not limited as to the type of computer 10. In one embodiment, computer 10 is a PC-compatible computer running Microsoft Windows 95 or Windows 3.11. The invention is also not limited as to the programming language in which the computer program is implemented. However, in one embodiment, the programming language is Java, an object-oriented programming language similar to C++.

In one particular case, the present invention is embodied within the computer program EchoSearch, which is commercially available from Iconovex Corporation. EchoSearch is a computer program written in Java and is capable of being run on a computer on which either the Windows 95, Windows NT, UNIX, or Macintosh operating system is installed. EchoSearch allows a computer user to query multiple Internet search engines simultaneously for information residing on the world-wide web (WWW) and on Usenet newsgroups. EchoSearch downloads and reads documents listed by these engines and creates a comprehensive, intelligent index, concept index, or summary index of the documents that can be viewed in a web browser, such as Netscape Navigator.

Insofar as EchoSearch incorporates the present invention, it is described herein as one embodiment of the invention. However, the present invention is not limited in scope as to EchoSearch. For example, EchoSearch employs the invention to leverage its qualified searching to electronically stored documents retrieved over the Internet as world-wide web pages or Usenet newsgroup messages. By comparison, the present invention is not so limited as to any particular domain. That is, the invention can be employed in applications outside the Internet. Any information that lies in electronically stored documents is amenable to searching in accordance with the present invention.

Figure 2:
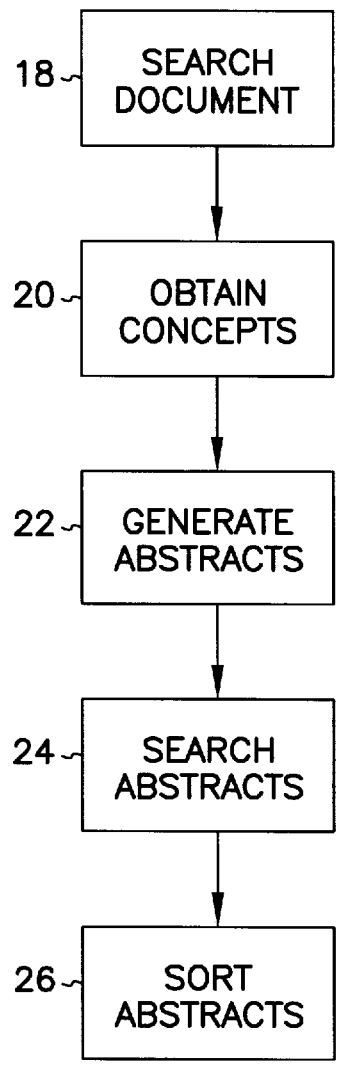
FIG. 2 is a flow chart of a method according to the present invention.

Referring now to FIG. 2, a flow chart of a method in accordance with the present invention is shown. In step 18, one or more electronically stored documents are searched. With respect to the EchoSearch embodiment of the invention, EchoSearch submits a user-defined search expression to a plurality of Internet search engines, which provide EchoSearch a listing of Internet pages that include the search expression. In the EchoSearch embodiment of the invention, step 18 is carried out in accordance with the method shown in FIG. 3.

Figure 3:
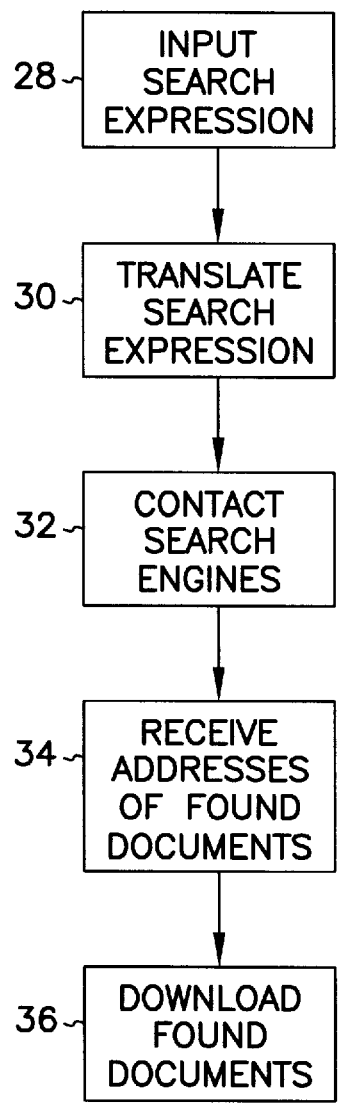
FIG. 3 is a flow chart of a method to search for documents containing a search expression, in accordance with a particular embodiment of the invention.

Referring now to FIG. 3, in step 28, the search expression is obtained by a user inputting the phrase on an input device attached to a computer on which the program is running (e.g., keyboard 12 coupled to computer 10, as shown in FIG. 1). The domain of electronically stored documents "searched" by EchoSearch is the set of Internet pages that have been previously searched by the various Internet search engines, and stored by those engines in different databases. Internet pages are electronically stored documents that are retrievable over the Internet, and are identified by an http: moniker, such as http://www.iconovex.com/index.htm. Search engines used by EchoSearch include AltaVista, Excite, Infoseek, Lycos, OpenText, and Webcrawler.

The search expression that the invention searches for in the one or more electronically stored documents in one embodiment is a list of one or more key words. If a key word is in fact a phrase, than that phrase is surrounded by quotation marks to indicate that the words must follow one another within a document to yield a match. For example, a search expression of ICE CREAM yields a match as to any electronically stored document that contains both the word ICE and the word CREAM. Conversely, a search expression of "ICE CREAM," wherein the words are surrounded by quotation marks, yields a match as to any electronically stored document that contains the phrase ICE CREAM, and not merely the individual words ICE and CREAM.

In other embodiments of the invention, the search expression may be more advanced. For example, the expression may comprise a list of one or more keywords separated by boolean operators such as AND, OR, and NOT, as commonly understood by those skilled in the art. For further example, in the case of the EchoSearch embodiment of the invention, one or more keywords can be selectively classified as "cannot include" or "must include." Words marked as "cannot include" cannot be in any of the documents found as matching, whereas those marked as "must include" must be in all the documents found as matching.

The EchoSearch embodiment of the invention delegates the responsibility of actually searching the Internet pages to the Internet search engines themselves. Still referring to FIG. 3, step 30 translates the search expression to a form understandable by each particular search engine. Step 32 then contacts the search engines by accessing their home pages on the world-wide web, and submitting an appropriately constructed query representing the search expression thereto. For example, to access the AltaVista search engine, the invention accesses the home page of AltaVista on the world-wide web, which is located at the URL address of http://www.altavista.digital.com. This embodiment of the invention thus requires that the computer on which it is running is connected to the Internet. This is typically accomplished by either a dial-up line through a modem and to an Internet Service Provider, or through a local-area network actually residing on the Internet as a domain, or as an Internet host.

Each of the search engines employed by EchoSearch conducts a search of the Internet pages indexed therein for the search expression as has been provided by EchoSearch. No Internet search engine is comprehensive with all the Internet pages available over the Internet. Different search engines have varying degrees of extensiveness as to the number of pages that they search, and have varying degrees of overlap among them. Thus, for example, a first search engine may search ten million Internet pages, and a second search engine may search five million pages, of which two million are also searched by the first engine.

As shown in step 34, the EchoSearch embodiment receives from each search engine a list of Internet pages, by URL address, that contain the search expression provided. EchoSearch waits for results from these search engines until a predetermined number of pages have been identified by the engines. Because EchoSearch is programmed in Java it is capable of multithreading. Each search engine returns results on a different thread, such that EchoSearch obtains results simultaneously as they come in from any search engine and ends the process when the predetermined number have been identified. For example, EchoSearch may wait until one hundred pages have been identified by a total of three search engines. The first search engine may be the first to produce results, identifying ten pages; EchoSearch then waits for ninety more pages. The third search engine may then identify fifty pages, followed by the second engine with twenty pages, and the first engine again, with ten pages. Because EchoSearch is multithreading, it does not wait for results first from one engine and then from another, but can receive results from all the engines simultaneously.

Once step 34 has received the URL addresses of the predetermined number of pages from the search engines, control is directed to step 36, which downloads these pages from the Internet. That is, the EchoSearch embodiment of the invention individually contacts each Internet page over the Internet, and saves the information. For example, if the URL address of one page identified by a search engine is http://www.abc.com/sample.htm, then the invention contacts this page over the Internet by accessing this URL address, and then saves the information found at that page.

As has been described, therefore, step 18 of FIG. 2 searches one or more electronically stored documents for a search expression. A user of the computer on which the EchoSearch embodiment is running typically enters in the search expression on a keyboard attached to the computer. EchoSearch translates the search expression into a form understandable by each of a number of different Internet search engines capable of being invoked over the Internet. EchoSearch then invokes each of these search engines, and waits for these engines to return a total of a predetermined number of Internet pages containing the search expression and identified by URL address. EchoSearch finally downloads the information found at each of these addresses.

In step 20 of FIG. 2, the significant concepts of each document downloaded in step 18 are identified. Concepts are the main ideas or themes of a document; every document has at least one concept. Concepts are identified by key words and phrases of the document. Concepts may be generated by linguistic analysis of the document, by statistical analysis, or by any other suitable type of analysis. Colloquially speaking, concepts describe what a particular document is "about." This is important, because not all documents containing a particular key word are about the key word. For example, a document can have the word "train" contained with the document, but may not be about "trains."

The invention obtains these concepts by use of natural language processors that are commercially available. Natural language processors typically employ either statistical analysis, linguistic analysis, or both types of analysis. One such natural language processor is Syntactica, which can be licensed from the Iconovex Corporation. Syntactica is a linguistic natural language processor that does not use statistical analysis. Specifically, the EchoSearch embodiment of the invention employs Syntactica Web API (SWAPI). SWAPI is a C-language interface to a library that enables client applications such as EchoSearch to perform linguistic analysis of Internet pages and then automatically hyperlink the various forms of linguistic output back to the original source data. EchoSearch provides to SWAPI each of the Internet pages it downloaded as a result of step 18. SWAPI then provides EchoSearch one or more concepts for each page.

Natural language processors such as Syntactica may use syntactic rules and semantic weights to determine the significant concepts within each document. Syntactica for example, checks each word against a primary lexicon, typically of over 100,000 words, and assigned a preliminary semantic value. Then, the syntax is analyzed to determine the relative importance of the concept's constituent elements. Finally, this semantic and syntactical information is combined to determine the overall importance of the concept. For example, linguistic analysis may assign twice as much value to phrases that are primary subjects of sentences as opposed to direct objects. The analysis may assign even less value if the phrase appears in a subordinated clause, and less still if it appears in some sort of parenthetical statement.

For example, assume that the phrase "nuclear power plants" appears in three sentences. Sentence one is "Nuclear power plants in the Northeast are responsible for 80% of Canada's acid rain." Sentence two is "Stricter environmental laws regulating radioactive waste have affected nuclear power plants throughout the United States." Sentence three is "Large-scale public works projects in the Soviet Union, such as dams, airports, and nuclear power plants, have inevitable been plagued by shoddy workmanship and inferior materials." In this example, "nuclear power plants" is used as a subject in sentence one, and receives the highest semantic value therein. The phrase is an object in sentence two, in which sentence it receives a lower semantic value. The phrase is a parenthetic element in sentence three, in which sentence it receives the least semantic value.

In step 22 of FIG. 2, abstracts for each of the concepts of each document containing the search expression are generated. An abstract is a description of a concept as that concept appears in a document. An abstract, however, is not typically a verbatim excerpt of the original text, although it employs the language of the original text to convey the manner in which the concept appears contextually in the document. Abstracts therefore expand upon a concept, and offer a quick glimpse at the context in which the key words or phrases are used. That is, the abstracts allow the user to immediately view the context in which each concept is used. Abstracts are also referred to as concept bodies.

The present invention also uses commercially available natural language processors to generate the abstracts. The natural language processor used in step 22 is typically the same as that used in step 20. With respect to the EchoSearch embodiment of the invention, EchoSearch performs a linguistic analysis on each document to obtain the abstracts by using the Syntactica natural language processor available from Iconovex Corporation, as has been described in conjunction with step 20. That is, EchoSearch employs Syntactica Web API (SWAPI). EchoSearch provides SWAPI with each of the Internet pages it downloaded as a result of step 18. SWAPI, in addition to providing EchoSearch one or more concepts for each page in step 20, also provides EchoSearch with an abstract for each of these concepts in step 22.

For example, in step 20 there may have been identified the concept entitled "tax code," and four different concepts entitled "tax reform" for a particular document. In step 22, the abstract for "tax code" may be "Representative Harris offers last-minute amendment to tax code," while the corresponding abstracts for "tax reform" may be "Tax reform long overdue," "Legislature votes on key tax reform proposals," "Reviewing tax reform of the 1980's," and "Speaker calls tax reform smoke and mirrors." Thus, each of these abstracts provides the user a view of the context in which the corresponding concepts are used in the document.

As has been described, therefore, steps 20 and 22 perform analysis on the documents identified as containing the search expression and downloaded in step 18. This analysis involves identifying the one or more concepts for each downloaded document in step 20, and generating an abstract for each concept in step 22. The EchoSearch embodiment of the invention utilizes the Syntactica natural language processor available from Iconovex Corporation to implement both steps 20 and 22.

In step 24 of FIG. 2, the abstracts generated in step 22 are further searched for the search expression. In a further embodiment of the invention, step 24 searches the abstracts generated in step 22 not only for the search expression itself, but related expressions or ideas as well. Step 24 is a keyword search as has been discussed in conjunction with step 18. With respect to the particular EchoSearch embodiment of the present invention, EchoSearch searches the abstract for each concept of each Internet page containing the search expression, for the search expression or related expressions or ideas.

In the further embodiment in which step 24 searches the abstracts generated in step 22 not only for the search expression itself, but also for related expressions or ideas as well, step 24 obtains these related expressions or ideas by looking up the search expression in a lexicon database of related expressions or ideas. Such databases are commonly available. In the EchoSearch embodiment of the invention, step 24 utilizes the WordNet lexicon database, developed by and available from Princeton University.

As an example of expressions and ideas related to a search expression, consider the search expression "dog." A lexicon database may have referenced under the word "dog" the word "canine," which is a synonym for dog. The lexicon may also have specific breeds of dogs, such as German Shepard, etc. Typically, however, the lexicon will not have a more general term for the search expression. For example, the word "mammal" will not be identified as a related expression or idea to the word "dog." Even though a dog is a mammal, including the word as related to the search expression "dog" runs against the goal of refining a given search, and instead actually widens the scope of the search. In particular, the WordNet lexicon database does not include more general expressions or ideas for a particular search expression as related.

Step 24 searches the abstracts for the search expression, and alternatively for related expressions or ideas as well, to refine the search results obtained in step 18. Step 18 yields simplistic searching, in that so long as a document contains the search expression, it is tagged. After processing in steps 20 and 22 to obtain the concepts and related abstracts of the documents, step 24 searches the abstracts for the search expressions, and alternatively for related expressions or ideas as well, to further narrow the search. Only those documents that have concepts having abstracts that contain the search expression, or alternatively related expressions or ideas, are produced by step 24. That is, step 24 identifies only those pages that are "about" the search expression, from the set of all documents containing the search expression as a result of step 18, as has been further processed in steps 20 and 22. In other words, step 24 products results that are significantly more relevant to the given search expression than are the unfiltered results of step 18; step 24, then, produces what are known as "qualified results."

For example, the search expression for a particular search may be "tax reform." In step 18, two documents may have been identified and downloaded as containing the phrase "tax reform." In step 20, the sole concept for one of the documents may be "tax code," whereas the sole concept for the other of the documents may be "tax reform" (i.e., identical to the search expression). In step 22, the abstract for the concept "tax code" may be "Representative Harris offers last-minute amendment to tax code," while the abstract for the concept "tax reform" may be "Tax reform long overdue." In step 24, therefore, only the latter abstract is identified; only the concept having the abstract "Tax reform long overdue" contains the search expression "tax reform." The other concept does not include the search expression, and therefore is not identified.

As has been described, therefore, step 24 provides for qualified search results. While step 18 conducts a search in which a predetermined number of Internet pages that each contain the search expression is obtained, step 24 qualifies the search results. Step 24 reduces the search results of step 18 to include only those documents identified in step 18 that have a concept having an abstract that also contains the search expression, or alternatively a related expression or idea. Because the abstract explains the context in which the concept of a document appears within the document, wherein the concept is one topic which the document is "about," step 24 ensures that only those pages that are "about" a particular search expression are provided to the user.

Thus, the present invention provides for a number of advantages. The invention refines the results of the search engines of step 18 to include only those results that are significantly more relevant to a given search expression. Even if a document contains the search expression, if the search expression, or alternatively a related expression or idea, is not also within the abstract of a concept of the document (as is tested for in step 24), then the document is not provided to the user. This provides for much greater accuracy in performing searches on electronically stored documents.

Finally, in step 26 of FIG. 2, the resulting documents having concepts that have abstracts containing the search expression are sorted and the abstracts of their concepts are presented to the user. The present invention is not limited to the particular manner in which the resulting documents are sorted. In one embodiment, the abstracts are sorted in alphabetical order of their corresponding concepts, and presented in this manner to the user. In another embodiment, the abstracts are sorted in order of significance of their corresponding concepts, and presented in this manner to the user. The EchoSearch embodiment employs the Syntactica program available from Iconovex Corporation to obtain the significance of the concepts.

With respect to the EchoSearch embodiment of the present invention, EchoSearch invokes a web browser, such as Netscape Navigator, to allow the user to view the resulting sorted abstracts. EchoSearch creates an HTML file that is readable by a web browser. EchoSearch then runs the web browser, with the HTML file as the object for the browser to initially open upon. This file includes the sorted concepts for the Internet pages, with their corresponding abstracts. Each concept is a hyperlink, such that a user can click on it to indicate to the web browser that the page associated with that concept should be retrieved. In the EchoSearch embodiment, a locally stored facsimile of the original document is shown, optionally without the graphics of the original page.

In this manner, the EchoSearch embodiment of the invention provides a full-fledged searching tool for Internet pages. A user wishing to search for pages related to a particular search expression is provided with a sorted list of concepts and corresponding abstracts for the most relevant pages with respect to that search expression. The concepts and abstracts provided may be sufficient to enable the user to find the information that he or she is particularly looking for. If it is not, however, the user only has to click on the appropriate hyperlink to actually jump to the particular Internet page itself (or the facsimile of the document as is stored locally) from which the concept and abstract were extracted.

As has been described, the present invention provides for refined searching of electronically stored documents, an example of which is illustrative in terms of how the method operates. Assume in step 18 that the search expression is "tigers," and that there are fifteen total documents to be searched, three of which contain tigers. Step 18 yields these three documents. Assume further that one of these documents is about tigers in Africa, while another refers to the Detroit Tigers, a major league baseball team, in passing, while the third document discusses extinct species, and merely mentions tigers in passing.

In accordance with this example, therefore, step 20 may result in a concept identified for each of these documents, "African tigers," "Major league baseball," and "Extinct species." For the sake of simplicity, this example assumes that each document has only one concept; however, in actuality typically every document has more than one concept. The abstracts resulting from step 22 may be, respectively, "African tigers have had their population decreasingly markedly for the past fifty years," "Major league baseball has not yet recovered from its recent strike," and "Extinct species may impact the entire global ecosystem." Each of these abstracts is not a verbatim excerpt from the documents which they regard, but rather are a distillation of the concepts in the context in which they are found in the documents.

Still in accordance with the example, step 24 then results in only one abstract being identified, the abstract for the concept "African tigers." The other abstracts do not contain the search expression, or a related expression or idea. Therefore, the invention renders the search results of step 18 more accurate. Whereas step 18 found three documents that contained the word tigers, steps 20, 22 and 24 together eliminated those documents that mentioned tigers, but were not actually conceptually about tigers. Finally, in step 26, the remaining document, having the concept "African tigers" is sorted, albeit irrelevant in the context of one document resulting from step 24.

Those of ordinary skill in the art will readily appreciate that many changes and modifications to the above drawings and description can be made without departure from the spirit or scope of the following claims. For example, the invention as described in the EchoSearch embodiment has been shown to apply only to electronically stored documents in the form of Internet document, including world-wide web pages and Usenet newsgroup messages. However, modification of the present invention to search any electronically stored documents, such as documents stored in a particular word processing format such as Microsoft Word or Corel WordPerfect, can be made without departing from the scope of the following claims.

What is claimed is:

1. A computerized method for searching electronically stored documents, comprising the steps of:
   searching each document for a search expression;
   analyzing each document containing the search expression to determine a plurality of significant concepts within the document;
   generating an abstract for each concept of each document containing the search expression;
   searching each abstract for the search expression; and
   sorting the abstracts in one of:
   a) the order of significance of their corresponding concepts; or
   b) the alphabetical order of their corresponding concepts.

2. The method of claim 1, wherein the search expression comprises one or more keywords.

3. The method of claim 1, wherein the search expression comprises two or more keywords separated by boolean operators.

4. The method of claim 1, wherein the step of searching each abstract for the search expression also searches each abstract for expressions or ideas related to the search expression.

5. A computerized system for searching documents, comprising:
   a storage device for storing the documents;
   a computer comprising:
      means for searching each document for a search expression;
      means for analyzing each document containing the search expression to determine a plurality of significant concepts within the document;

means for generating an abstract for each concept of each document containing the search expression;

means for searching each abstract for the search expression; and sorting the abstracts in one of:
   a) the order of significance of their corresponding concepts; or
   b) the alphabetical order of their corresponding concepts.

6. The system of claim 5, wherein the search expression comprises one or more keywords.

7. The system of claim 5, wherein the search expression comprises two or more keywords separated by boolean operators.

8. The system of claim 5, wherein the means for searching each abstract for the search expression also searches each abstract for expressions or ideas related to the search expression.

9. A computer-readable storage medium having a computer program executable on a suitably configured computer, the computer program directing the computer to perform a method comprising the steps of:

searching each document for a search expression;

analyzing each document containing the search expression to determine a plurality of significant concepts within the document;

generating an abstract for each concept of each document containing the search expression;

searching each abstract for the search expression; and sorting the abstracts in one of:
   a) the order of significance of their corresponding concepts; or
   3.b) the alphabetical order of their corresponding concepts.

10. The storage medium of claim 9, wherein the search expression comprises one or more keywords.

11. The storage medium of claim 9, wherein the search expression comprises two or more keywords separated by boolean operators.

12. The storage medium of claim 9, wherein the step of searching each abstract for the search expression also searches each abstract for expressions or ideas related to the search expression.

\* \* \* \* \*